United States Patent [19]
Kesselman

[11] 4,181,987
[45] Jan. 8, 1980

[54] ON-OFF SNAP ACTION WATER AND HEAT SAVING VALVE ATTACHMENT FOR SINK SPOUT

[76] Inventor: Joseph J. Kesselman, c/o The Abacon Agency, 16 Pont St., Great Neck, N.Y. 11021

[21] Appl. No.: 948,788

[22] Filed: Oct. 5, 1978

[51] Int. Cl.² .................... E03C 1/00; E03C 1/04
[52] U.S. Cl. .................................. 4/191; 4/192; 4/1; 137/606; 137/DIG. 2; 239/428.5; 239/DIG. 18; 251/321
[58] Field of Search ................. 239/428.5, DIG. 18; 4/191, 192; 251/321, 75; 137/606, DIG. 2

[56] References Cited
U.S. PATENT DOCUMENTS

| | | | |
|---|---|---|---|
| 1,317,885 | 10/1919 | Morris | 251/321 X |
| 1,439,763 | 12/1922 | Schaffer | 251/321 X |
| 1,462,263 | 7/1923 | Chaney | 251/321 X |
| 1,916,513 | 7/1933 | Jones | 251/321 X |
| 2,208,031 | 7/1940 | Hooper | 251/321 X |
| 2,783,035 | 2/1957 | Rosenberg | 239/DIG. 18 |
| 2,986,341 | 5/1961 | Goodrie | 239/428.5 |
| 3,341,132 | 9/1967 | Parkison | 239/428.5 X |
| 3,544,065 | 12/1970 | Mercier | 251/321 X |

Primary Examiner—Henry K. Artis
Attorney, Agent, or Firm—Eric P. Schellin

[57] ABSTRACT

An attachment for the spout of a sink fixture permits the stream of mixed hot and cold water to be readily turned all the way on and off, by simple flipping of a snap-action lever control, without it being necessary to adjust the hot or cold faucets. The flipping is non-critical and does not require any fiddling. The desired temperature and rate of flow are maintained, after having been initially achieved, during subsequent turnings on and off of the stream. The attachment is designed to be screwed into place between the spout and its matching non-splash aereator, normally screwed directly to the spout.

10 Claims, 5 Drawing Figures

ON-OFF SNAP ACTION WATER AND HEAT SAVING VALVE ATTACHMENT FOR SINK SPOUT

CROSS REFERENCE TO RELATED APPLICATIONS

There are no related applications.

SUMMARY

Recent events in the field of energy sources and in the field of the environment have made the need to conserve energy and to conserve potable water, so that both can reach farther, more evident.

One source of unnecessary loss of energy and water is the domestic sink, at which the stream of mixed hot and cold water is often kept running, for convenience of the user, even at moments when not actually needed. This occurs, for example, when shaving or when washing dishes and rinsing them individually.

The reason the user does not turn the water on and off during the shaving or dishwashing operation is that it is simply too much bother to adjust the hot and cold water faucets. The action required is not simple, like the flicking on and off of a wall electric light switch, but is critical in the sense that, each time the adjustment is made, the user must find the exact setting by watching the stream, testing its temperature, and setting the valves accordingly.

Since both a hot and cold valve are involved, there are two degrees of freedom, and two critical adjustments are required.

Even in the case of a modern single-handle mixer valve sink, there are still two degrees of freedom, for the handle must be moved in one direction to control the volume of the stream and in a perpendicular direction to control the temperature of the stream.

It is an object of the invention to permit the user to turn the ready mixed stream of water on or off without the fiddling with faucets required to adjust in accord with two degrees of freedom, but, instead, to turn the stream on or off with a snap action, as easily as the user would snap a wall light switch on or off. The small effort required of the herein disclosed attachment encourages its use to save heat and water.

The magnitude of the saving will be appreciated when it is noted that a person washing and rinsing an assortment of dishes from a family meal will need a brief flow of water perhaps 20 to 50 times. A person shaving will, while lathering up and rinsing the safety razor, need a brief flow of water perhaps a dozen times.

Accordingly, the invention utilizes an attachment for a sink spout having a snap-action valve which is stable in its full on or full off positions and which will not hold a position in between.

This snap action valve is provided with a flip lever, of such configuration as to readily permit easy flipping thereof, to change the setting of the snap action valve from full on to full off and vice versa.

Furthermore the attachment is provided, on its upper and lower ends, with oppositely facing male and female threaded portions, matched to fit the thread on the nozzle end of the spout. This enables the customary non-splash aereator, mounted on the end of the spout, to be unscrewed. The attachment is then screwed onto the nozzle end of the bare spout and the aereator is, in turn, screwed onto the attachment. Thus, it is not necessary to replace a previously present aereator.

THE DRAWINGS

DETAILED DESCRIPTION

Figure 1:
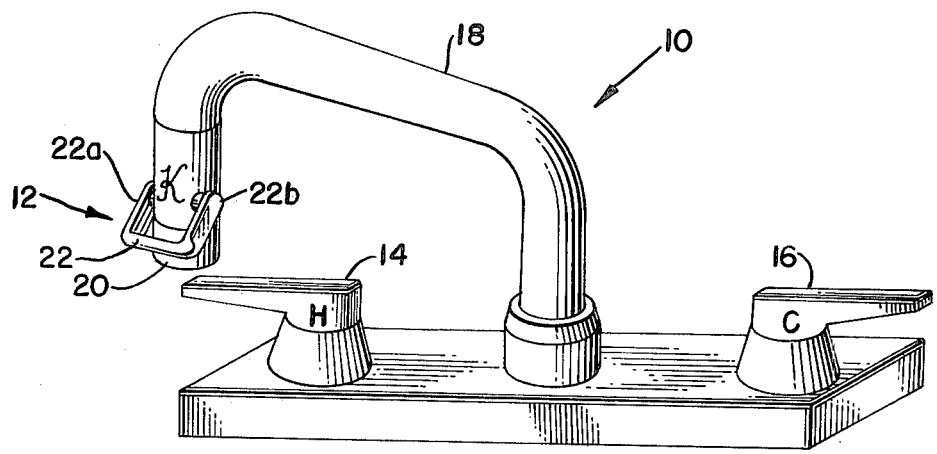
FIG. 1 is a perspective view of the attachment described herein, installed between the spout and the aereator of a sink plumbing fixture.

The perspective view of FIG. 1 pictures a conventional sink fixture 10 with the attachment 12 installed.

The fixture includes hot and cold faucets 14 and 16, a spout 18 and a non-splash aereator 20.

It will be noted that the attachment 12 is installed between the spout 18 and the non-splash aereator 20.

The attachment 12 includes a snap action on and off valve, which is controlled by flip lever 22.

The non-splash aereator 20 would initially be screwed on to the spout 18, by means of matching male and female threads 24m and 24f (seen in FIG. 2) on the spout 18 and the non-splash aereator 20, respectively.

In order to add the attachment 12, to the original fixture, the non-splash aereator 20 had been unscrewed from the spout 18 and the attachment has been screwed on instead, matching the male and female threads 24m and 25f to each other. Then the non-splash aereator 20 had been screwed onto the attachment 12, matching the male and female threads 25m and 24f to each other.

In order to make this possible, all the threads have the same nominal diameter and pitch. In the U.S., the standard pitch in this application is always 27 threads to the inch, while the common nominal diameter is 55/64 of an inch, although 12, 13 and 15 sixteenths of an inch are also seen from time to time.

The attachment 12 includes a casing 30 having an upper chamber 32, a lower chamber 34 and a partial partition therebetween, said partition defining a conical valve seat 36. A ball 38 is adapted to be seated against the conical valve seat 36, thereby cutting off communication between upper chamber 32 and lower chamber 34.

Ball 38 is normally held on conical valve seat 36 by means of spring 40, but can be lifted off by the nose of hairpin cam 42, mounted on shaft 44. The shaft 44 can be turned through an angle of about 60 degrees by means of flip lever 22 (shown in both its real "on" and in its phanton "off" position in FIG. 2). The flip lever 22 has two arms 22a and 22b, which respectively extend from the flip lever 22 to the opposite ends of shaft 44, so that when flip lever 22 is raised for "off" or lowered for "on", the shaft 44 is correspondingly rotated.

Figure 2:
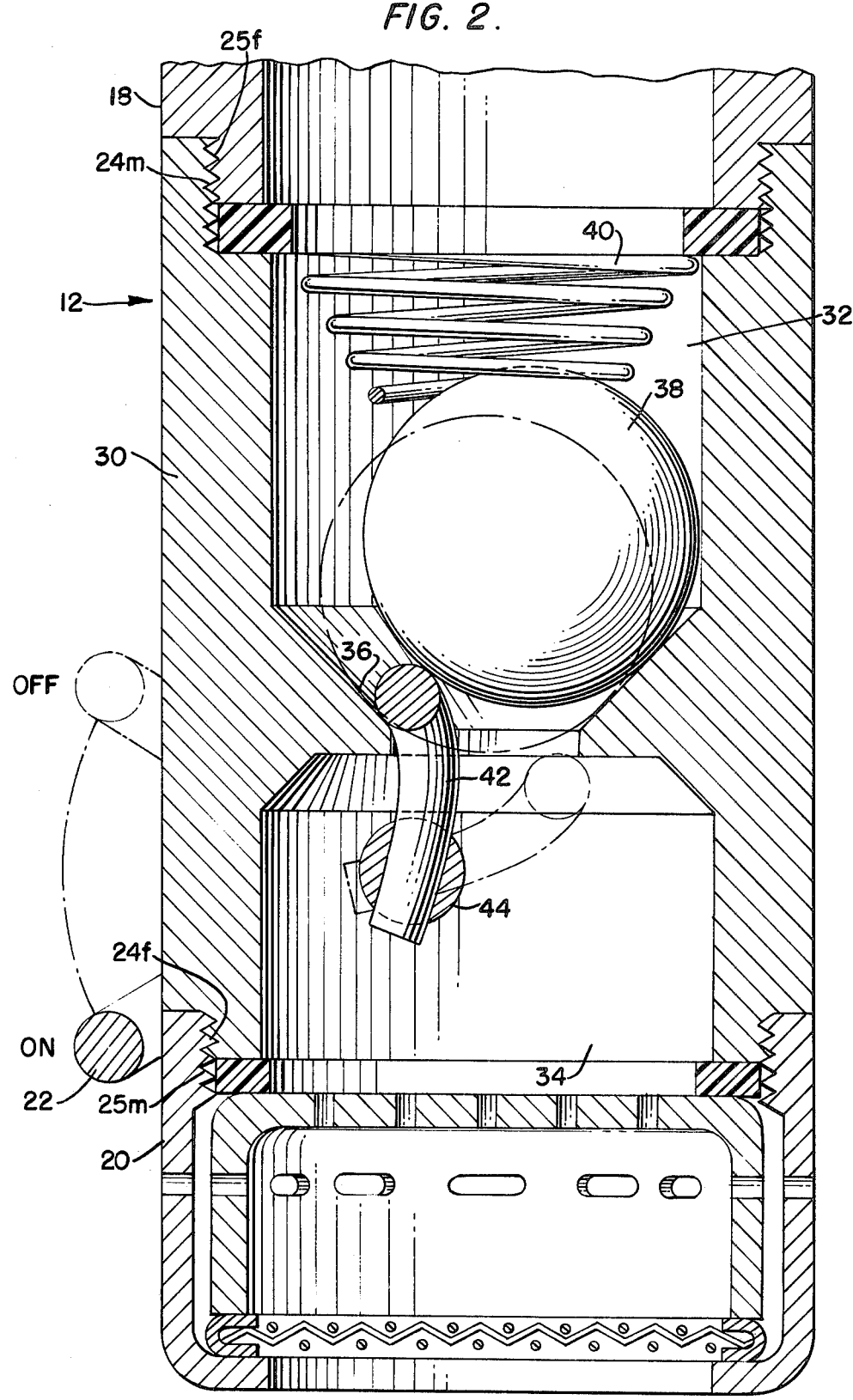
FIG. 2 is a partially exploded cross sectional view of a portion of the spout, the attachment and the aereator. The longitudinal axis of the adapter lies in the plane of the view.

In FIG. 2 the hairpin cam 42 is shown in its "on" position, in which the nose of the hairpin cam 42 lifts the ball off its conical valve seat 36, whereby water can flow downwardly through the attachment 12. The "off" position, in which the nose of hairpin cam 42 is moved away from ball 38, thereby permitting the ball 38 to close with its conical valve seat 36 and cut off the flow of water through attachment 12, is shown in phantom lines.

Figure 3:
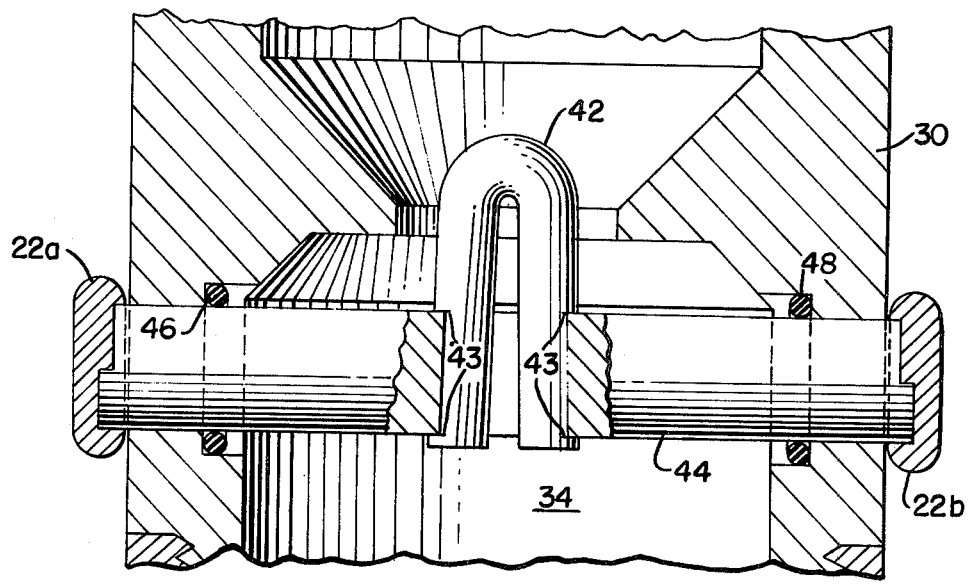
FIG. 3 is another partially exploded view, taken on a plane parallel to the longitudinal axis of the adapter and at right angle to the view of FIG. 2.

The construction of the hairpin cam 42 is seen in FIG. 3. The hairpin cam is a round rod, bent double, as shown. The rod is bent double in a press, using swaging dies which will coin the legs to form shoulders 43.

The shaft 44 has, in its center, a longitudinal slot with rounded ends. After the shaft 44 is inserted into position, as seen in FIG. 3, the hairpin cam 42 is forced into the slot, thereby springing the two legs of hairpin cam 42 together. However, as the hairpin cam 42 reaches its final position with respect to shaft 44, the legs spring out and the shoulders 43 bear against the shaft 44, thereby locking the hairpin cam 42 in position on shaft 44.

Water is prevented from leaking out of lower chamber 34, along shaft 44, by means of elastomeric O-rings 46 and 48. These O-rings provide a pressure tight seal between the shaft 44 and casing 30. It is to be noted that an O-ring seal does not depend on the squeezing of an oversize ring inside the recess in which it is seated. Instead, each of the O-rings 46 and 48 is made to be rather pliable and to lightly touch the walls of the recess and the shaft 44. When water pressure is felt by an O-ring, the O-ring wanders slightly along the shaft towards the low pressure side, and then squashes slightly against the shoulder which stops further wander. The squashing under the influence of water pressure causes the ring to bear harder on either side of a low pressure gap, with a force that depends on the water pressure. Thus, an O-ring is self-adjusting to a considerable degree of variations in sizes of parts or pressures involved.

The O-rings 46 and 48 are slid onto shaft 44 during assembly of shaft 44 with casing 30, before the hairpin cam 42 is inserted.

Figure 5:
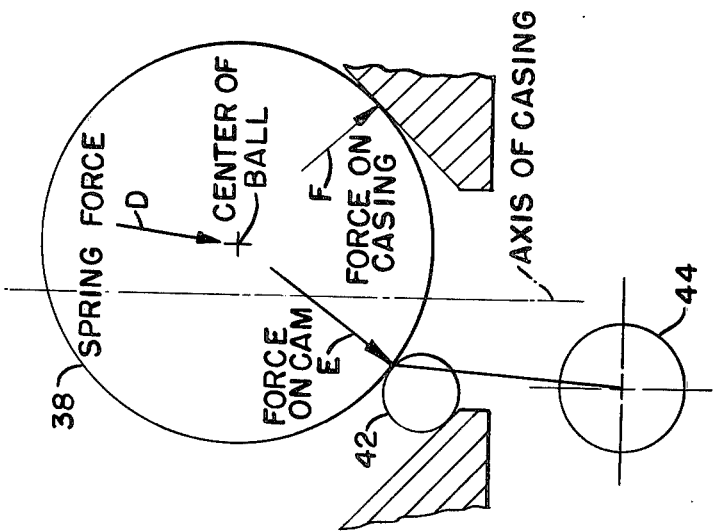
FIGS. 4 and 5 are two diagrams showing the toggle forces present when the snap action valve is respectively shut and open.
Figure 4:
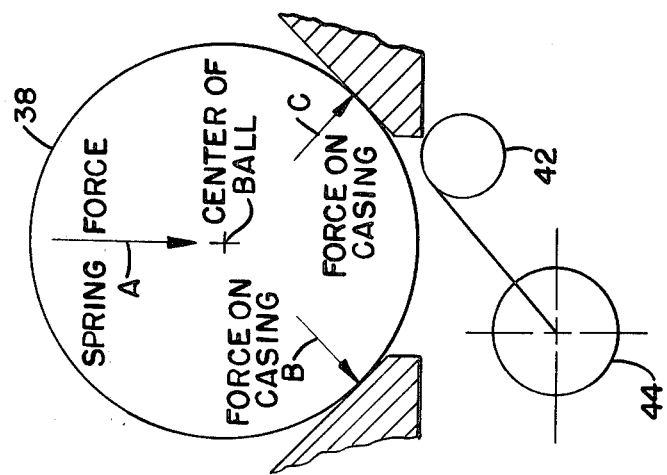

The reason the ball 38 and hairpin cam 42 act in snap fashion to completely open or close the fluid passage through the attachment 12 is readily seen in FIGS. 4 and 5.

In FIG. 4 the ball 38 is seated and the spring force A from spring 40 is vertically downward. This vertical spring force A is distributed evenly around the conical ring valve seat 36, as shown by arrows B and C. If the nose of cam 42 attempts to lift ball 38, it is obvious that the ball will resist. Thus, the attachment stays in its "off" position, if left alone.

In FIG. 5 the ball 38 is shown lifted into the "on" position. The resulting spring force D is larger, because the spring 40 is compressed and, further, the spring force D is no longer vertical because the spring 40 has been distorted sidewise, as can be seen in FIG. 2. The spring force D is resolved to only two forces, E and F, because the ball is now in two-point contact with the nose of the hairpin cam 42 and with one point of the conical valve seat 36. It is apparent from FIG. 5 that, if the hairpin cam 42 attempts to get out from under the ball 38, that the ball 38 will resist such an attempt. Thus, the attachment will stay in its "on" position if left alone.

The manufacture of the attachment 12 presents no great problems. After the holes for the shaft 44 are molded or drilled, the spaces for the O-rings 46 and 48 are simultaneously formed in a drill press or vertical spindle milling machine with a recessing tool, as will be apparent to a machinist. The arms 22a and 22b of flip lever 22 are coined with keyed recesses to fit the keyed ends of shaft 44. The assembly of said arms to the shaft is in a press. The press removes a slight bend in flip lever 22, which bend permitted arms 22a and 22b to be slipped and snapped over the ends of shaft 44.

If the ball 44 is hard metal, the casing 30 is preferably softer, and is made of a material such as injection molded nylon. If the casing is hard metal, the ball is preferably a firm polymeric material.

It should be noted that the attachment is well adapted for easy use. The flip lever 22 can be flipped up and down as easily as can the standard wall switch. Practically no thought need be given, and the user will do the flipping in a semi-automatic manner while his thought will be occupied with more important things. The particular up-down motion of the flip lever 20 facilitates this, because of the ninemonic connection between flipping the lever down to cause the water to cascade down and flipping the lever up to cause the water to shut off, since the upward flip goes against the motion of the water. Thus, the motions required of the user are natural, and require no training.

If desired, limit-of-motion stops can be provided in attachment 12 to prevent flip lever 22 from abutting against the chrome finish of the attachment 12 or the aereator 20. Such stops have not been illustrated in the drawing in order to keep the drawings simple and because the stops are a perfecting feature, not needed for satisfactory operation. As shown in FIG. 2, in the "on" position, there is an inherent internal stop by virtue of the fact that the nose of hairpin cam 42 rests on the conical valve seat 36. An internal stop could also be provided, if desired, which would prevent the nose of hairpin cam 42 from departing far enough from the surface of ball 38, in its seated position, to permit flip lever 22 to abutt against the attachment 12.

I claim:

1. An attachment for use between a sink spout and the non-splash aereator for said spout, said attachment comprising:
    a casing having a generally longitudinal axis;
    means, including a passageway along said longitudinal axis, for operatively connecting said sink spout to said non-splash aereator;
    a partial partition across said passageway dividing said passageway into a first chamber and a second chamber;
    the side of said partition closer to said spout defining a valve seat;
    a ball in said first chamber adapted to seat against said valve seat;
    spring means for normally biasing said ball against said valve seat, whereby, when said ball is seated, the said passageway is interrupted and water cannot flow from said spout to said aereator;
    snap action means for lifting said ball from said valve seat, whereby, when said ball is lifted, water can flow through said passageway from said spout to said aereator.

2. The attachment of claim 1 in which said means for operatively connecting said sink spout to said aereator comprises:
    matching male and female threads at the upper and lower ends of said casing;
    said male and female threads also matching the male and female threads of said spout and aereator.

3. The attachment of claim 2 in which said snap action means has a range of motion of which the end limits are stable and the intermediate portion is unstable.

4. The attachment of claim 3 in which the said ball is lifted from said valve seat by said snap action means when it is in one of said end limits and in which said ball is not lifted from said valve seat when said snap action means is in the other of said limits.

5. The attachment of claim 4 in which the snap action means comprises a cam having a range of motion, for lifting the said ball when the snap action means is in said one of said end limits;
said cam retreating from said ball, permitting it to close on its valve seat, when said snap action means is in said other of said end limits.

6. The attachment of claim 5 in which said cam, when said snap action means is in said one of said end limits, is latched by the pressure exerted by said spring means against said ball and hence against said cam.

7. The attachment of claim 5 in which the snap action means comprises the said spring, said ball and said cam, operatively located with respect to each other so that the pressure of said spring means on said cam by way of said ball tends to drive the cam, in toggle fashion, away from the midrange of said range of motion towards one of the end limits of said range of motion.

8. The attachment of claim 7 in which said passageway, during operative use, is vertical.

9. The attachment of claim 8 in which at least a portion of said snap action means is located in said second chamber.

10. The attachment of claim 9 in which said snap action means is actuated by a manually operated flip lever.

* * * * *